Dec. 29, 1959 E. R. WOODING 2,918,865

CHAIN PRINTER TIMER

Filed Dec. 27, 1957 4 Sheets-Sheet 1

INVENTOR
EDWIN R. WOODING
BY
Brumbaugh, Free, Graves & Donohue
HIS ATTORNEYS

Dec. 29, 1959 E. R. WOODING 2,918,865

CHAIN PRINTER TIMER

Filed Dec. 27, 1957 4 Sheets-Sheet 2

INVENTOR.
EDWIN R. WOODING
BY
Brumbaugh, Free, Graves & Donohue
HIS ATTORNEYS

Dec. 29, 1959 E. R. WOODING 2,918,865

CHAIN PRINTER TIMER

Filed Dec. 27, 1957 4 Sheets-Sheet 3

INVENTOR
EDWIN R. WOODING
BY
Brumbaugh, Free, Graves & Donohue
HIS ATTORNEYS

| TYPE POSITION NUMBER | CHARACTER | 32 | 16 | 8 | 4 | 2 | 1 | CHAIN CHARACTER DISTRIBUTOR |
|---|---|---|---|---|---|---|---|---|
| 1 | 1 | O | O | O | O | O | X | 1 |
| 2 | 2 | O | O | O | O | X | O | 2 |
| 3 | 3 | O | O | O | O | X | X | 3 |
| 4 | 4 | O | O | O | X | O | O | 4 |
| 5 | 5 | O | O | O | X | O | X | 5 |
| 6 | 6 | O | O | O | X | X | O | 6 |
| 7 | 7 | O | O | O | X | X | X | 7 |
| 8 | 8 | O | O | X | O | O | O | 8 |
| 9 | 9 | O | O | X | O | O | X | 9 |
| 10 | # | O | O | X | O | X | X | 11 |
| 11 | @ | O | O | X | X | O | O | 12 |
| 12 | ZERO | O | X | O | O | O | O | 16 |
| 13 | / | O | X | O | O | O | X | 17 |
| 14 | S | O | X | O | O | X | O | 18 |
| 15 | T | O | X | O | O | X | X | 19 |
| 16 | U | O | X | O | X | O | O | 20 |
| 17 | V | O | X | O | X | O | X | 21 |
| 18 | W | O | X | O | X | X | O | 22 |
| 19 | X | O | X | O | X | X | X | 23 |
| 20 | Y | O | X | X | O | O | O | 24 |
| 21 | Z | O | X | X | O | O | X | 25 |
| 22 | , | O | X | X | O | X | X | 27 |
| 23 | % | O | X | X | X | O | O | 28 |
| 24 | – | X | O | O | O | O | O | 32 |
| 25 | J | X | O | O | O | O | X | 33 |
| 26 | K | X | O | O | O | X | O | 34 |
| 27 | L | X | O | O | O | X | X | 35 |
| 28 | M | X | O | O | X | O | O | 36 |
| 29 | N | X | O | O | X | O | X | 37 |
| 30 | O | X | O | O | X | X | O | 38 |
| 31 | P | X | O | O | X | X | X | 39 |
| 32 | Q | X | O | X | O | O | O | 40 |
| 33 | R | X | O | X | O | O | X | 41 |
| 34 | $ | X | O | X | O | X | X | 43 |
| 35 | * | X | O | X | X | O | O | 44 |
| 36 | & | X | X | O | O | O | O | 48 |
| 37 | A | X | X | O | O | O | X | 49 |
| 38 | B | X | X | O | O | X | O | 50 |
| 39 | C | X | X | O | O | X | X | 51 |
| 40 | D | X | X | O | X | O | O | 52 |
| 41 | E | X | X | O | X | O | X | 53 |
| 42 | F | X | X | O | X | X | O | 54 |
| 43 | G | X | X | O | X | X | X | 55 |
| 44 | H | X | X | X | O | O | O | 56 |
| 45 | I | X | X | X | O | O | X | 57 |
| 46 | . | X | X | X | O | X | X | 59 |
| 47 | ⌑ | X | X | X | X | O | O | 60 |
| 48 | BLANK | O | O | O | O | O | O | 0 |

FIG. 5.

INVENTOR
EDWIN R. WOODING
BY
HIS ATTORNEYS

United States Patent Office 2,918,865

Patented Dec. 29, 1959

2,918,865

CHAIN PRINTER TIMER

Edwin R. Wooding, Poughkeepsie, N.Y., assignor to International Business Machines Corporation, New York, N.Y., a corporation of New York Application December 27, 1957, Serial No. 705,678

10 Claims. (Cl. 101—93)

The present invention relates to printing machines and more particularly to new and improved chain printer mechanism embodying novel electronic circuit means for controlling the sequence of actuation of a plurality of printing hammers.

Printing machines have been devised in which type members continuously moving in one direction are adapted to be struck selectively by hammers controlled by means responsive to coded data represented by perforations in cards, for example. In one form of such apparatus, cards are adapted to be sensed by sensing means comprising pins arranged to engage a plurality of card index points simultaneously. The pins, as set up by the card, are locked in place by latches which cooperate with permutation blocks moving in synchronism with frames supporting the type members. When the latches are positioned by block surfaces corresponding to the character represented by the pin setup, the pins are unlocked to effect an actuation of the hammer operating means.

It is an object of the invention to provide novel and improved printing machinery of the above character in which electronic means is employed for controlling the sequence of actuation of the hammers.

Another object of the invention is to provide new and improved printing machines of the above character in which a pure serial type of printing can be obtained.

In accordance with the invention, printing mechanism is provided in which a magnetic drum is synchronized with an endless type-carrying chain. Information to be printed is stored on the drum parallel by bit, serial by digit, at locations on the drum which correspond to the horizontal printing positions on a record strip. When reading this information from the drum, the type is presented serially to the various hammer locations. To this end, the type spacing is made greater than the hammer spacing.

In a preferred embodiment, data to be printed is stored on the magnetic drum in a multiple bit binary code. The length of each track is made sufficient to include one storage location for each hammer position together with several additional terminal storage positions to allow time for circuit switching at the end of each scan of the hammers. A chain character distributor comprising an electronic counter, for example, serves to determine which one of the type characters is opposite any of the hammer positions at any drum location. Means, termed hereinafter a print location distributor, serves to relate the drum location positions to the hammer positions. Circuit means is also provided to compare the contents of any drum location with the contents of the chain character distributor, and if the comparison indicates equality, to determine whether the type character said to be in printing position is in the printing position specified by the drum under the control of the print location distributor. Upon coincidence of these several conditions, circuitry controlling the operation of the hammers is actuated to print a character upon the record strip.

For a better understanding of the invention, reference is made to the following detailed description of a representative embodiment, taken in conjunction with the accompanying drawings, in which:

Fig. 5 is a tabulation that is useful in describing the operation of the system shown in Fig. 4.

Figure 1:
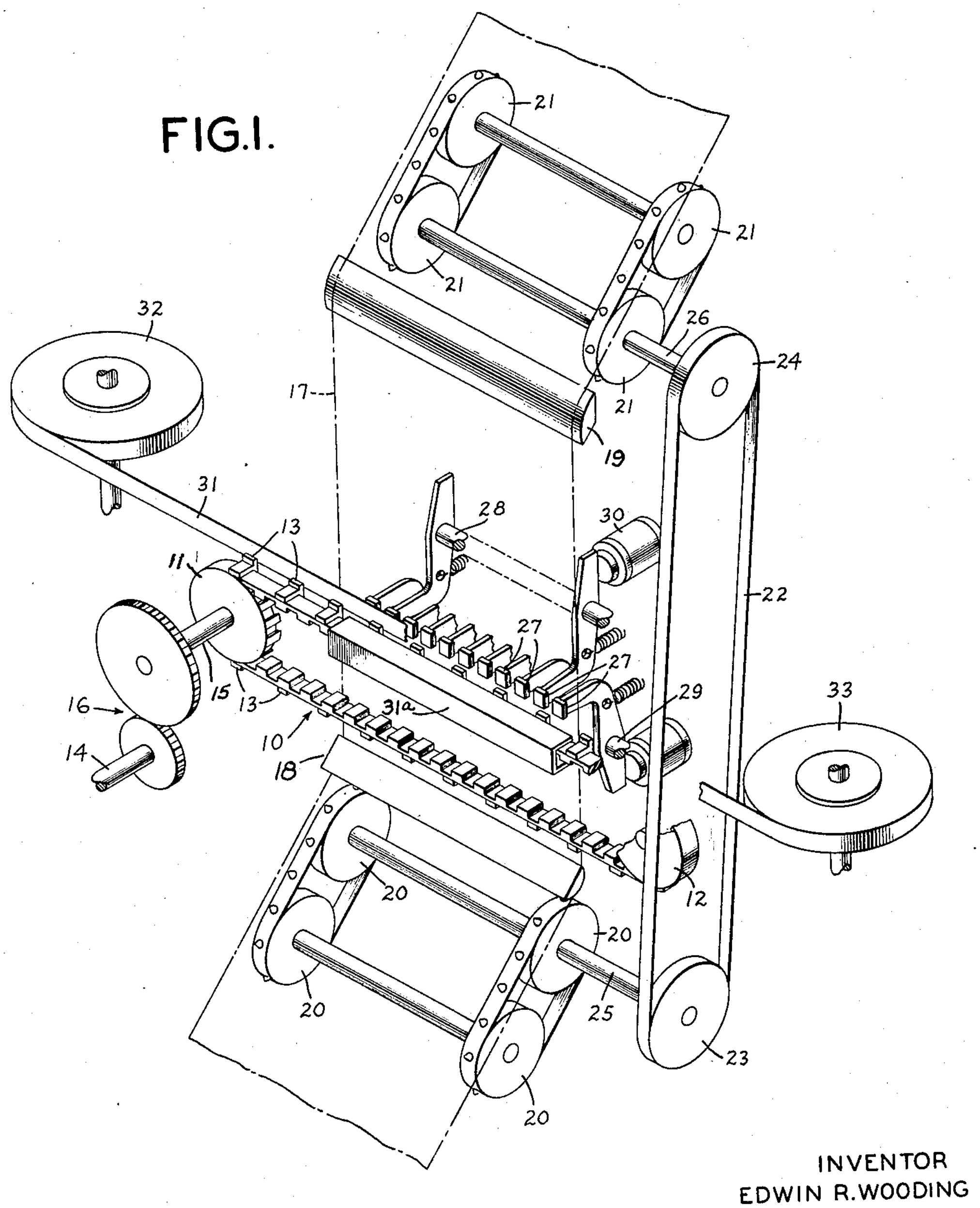
Fig. 1 is a schematic diagram of a simplified form of printing machine constructed according to the invention.

In the interest of simplicity, the invention will be illustrated first as embodied in a simplified form of printer capable of printing any one of the ten decimal digits 0 through 9 in eleven equally spaced columns across the page. Referring to Fig. 1, the printer comprises an endless chain belt 10 supported on spaced apart rollers 11 and 12 and carrying a plurality of equally spaced type members 13 thereon. In the typical example, the type members 13 are twenty in number, comprising two sequences of the ten decimal digits 0 through 9. The roller 11 is adapted to be driven by motive means (not shown) through the shafts 14 and 15 and the gearing 16 to move the belt 10 transversely of a record strip 17.

The record strip 17 is adapted to pass under and over guide members 18 and 19, respectively, and to be advanced step by step by conventional means including the lower sprocket wheels 20 and the upper sprocket wheels 21. The wheels 20 and 21 are mechanically coupled by an endless belt 22 carried by rollers 23 and 24 mounted on the shafts 25 and 26, respectively.

Printing of the characters represented by the type members 13 on the record strip 17 is accomplished by a plurality of type hammers 27 pivotally mounted on the shafts 28 and 29. The hammers 27 are normally maintained out of engagement with the record strip 17 and are adapted to be actuated by a plurality of electromagnets 30 energized in a manner to be described later. Upon actuation of any hammer 27, it strikes the adjacent type member 13 on the belt 10 so that the corresponding character is printed on the record strip 17 through an inked ribbon 31 supported by supply and takeup spools 32 and 33. A guide member 31*a* is provided to guide the type members 13 and to provide impact resistance therefor.

Since the information to be printed is stored serially, the type carried by the type members 13 should be spaced apart farther than the hammers, the ratio of type spacing to hammer spacing being sufficient to insure that one and only one piece of type is in printing relation to a hammer at any one time. In the illustrative example shown in Fig. 1, the relation is such that eleven hammers span ten type members 13.

Figure 2:
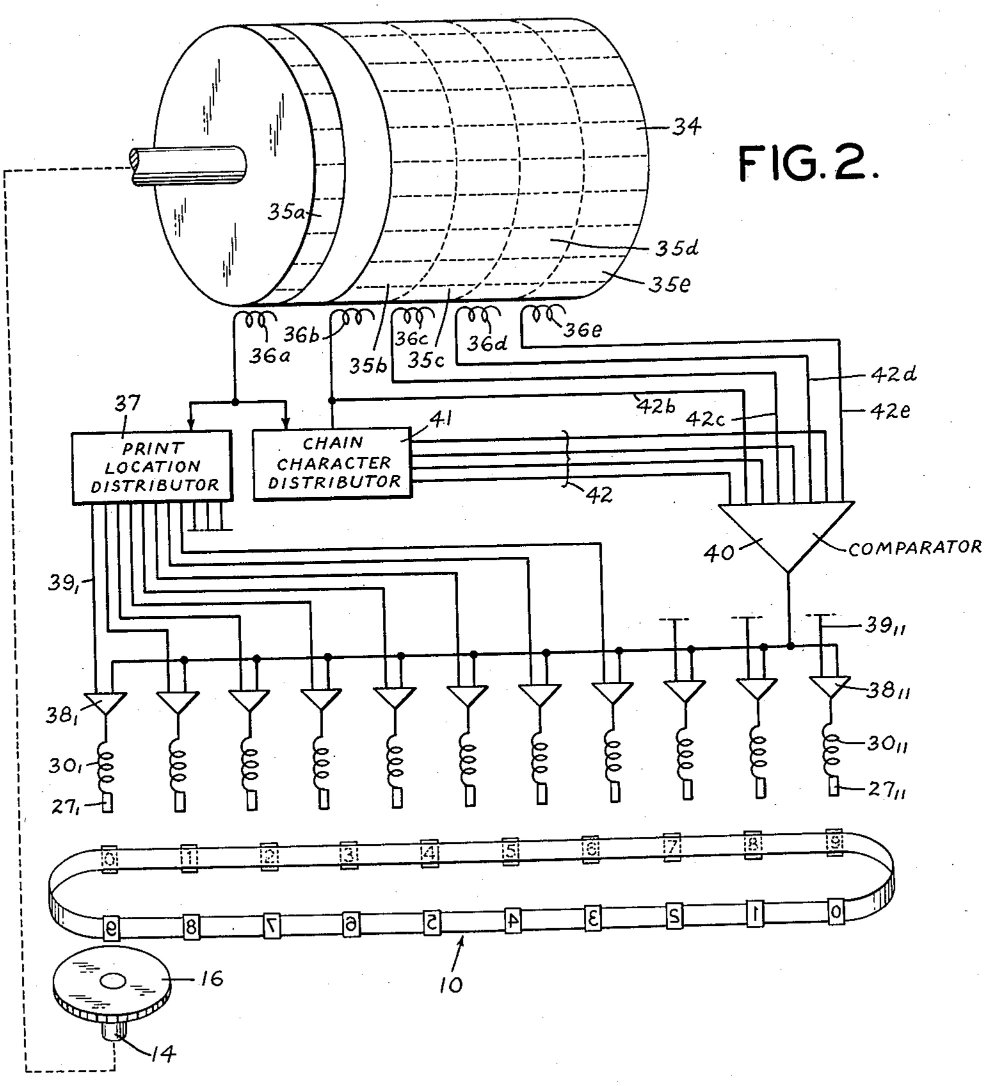
Fig. 2 illustrates schematically a typical control circuit that might be used with the printing machine of Fig. 1.

Data to be printed are stored on a magnetic drum 34 (Fig. 2) which is mechanically coupled to the type chain drive shaft 14 by gearing (not shown) such that the chain belt 10 will advance one full character position for each revolution of the drum 34. The data are stored paralled by bit, serial by digit on the drum 34 in a four bit binary code in which the bit weights are one, two, four and eight. A plurality of tracks 35*b*–35*e*, inclusive, are provided on the drum 34 for the four bits, each track being eleven storage locations in length. Also located on the drum 34 is a timing track 35*a*.

Since a finite time is required to advance the drum 34 from storage location to storage location, it is necessary that this time be reflected in the spacing of the type characters on the chain belt 10. Actually, the center to center spacing of the type characters must be greater than the center to center spacing of the print positions by the distance representing the time for the drum 34 to advance from one storage location to the next.

The information stored in the timing track 35*a* of the drum 34 is sensed by inductor means 36*a* which supplies an electrical input to a print location distributor device 37. The print location distributor 37 is a conventional four stage binary counter with the ability to count the decimal digits one through eleven. When the several first storage locations on the drum 34 are being read, the print location distributor device 37 contains the decimal digit one; as the drum 34 advances to the position where storage location two is read, it advances one and will contain the decimal digit two, etc., until the drum 34 is at the position for reading the eleventh storage location, at which time the print location distributor 37 will contain the decimal digit eleven. As the drum 34 continues to advance from the position for reading the eleventh storage location to the position where the first storage location is to be read on the second scan, the print location distributor 37 will advance from eleven to one and will repeat counting two, three, four, etc., as on the first scan.

As the print location distributor 37 counts repeatedly from one to eleven, it is adapted to supply electrical pulses successively to the amplifiers $38_1$–$38_{11}$, respectively, over the conductor means $39_1$–$39_{11}$, respectively. The amplifiers $38_1$–$38_{11}$, respectively, are adapted to energize the magnets $30_1$–$30_{11}$, respectively, for the respective hammers $27_1$–$27_{11}$ progressively in time as each location corresponding to a given hammer position is read, commencing with the extreme left hand position and progressing to the extreme right-hand position. However, the energization effected by the print location distributor 37 alone is not sufficient to actuate any of the hammers in the absence of a coincident pulse or pulses from a comparator device 40, which will be described in greater detail below.

The timing signal output from the inductor 36*a* is also fed to a chain character distributor 41 which is a conventional four position binary counter capable of counting in integers of one the decimal notations zero through nine, respectively. It is driven in such fashion as to increase its count by one decimal integer as the drum 34 passes a position where a storage location is to be read. Thus, if the chain character distributor 41 contains a zero when the drum 34 is in the position where storage location one can be read, it will advance to a one as the drum comes to the position where storage location two is read, etc. When the drum 34 is at the position where location ten is read, the chain character distributor 41 will contain a nine and will again contain a zero when the drum 34 advances to the reading position for the eleven storage location.

The character in position to be printed (as indicated by the reading of the chain character distributor) regardless of its location is adapted to be compared with the character stored in a location on the drum 34. To this end, the output of the chain character distributor 41 is fed over conductor means 42 to the comparator device 40. The comparator device 40 also receives electric signals representing the characters stored in the drum 34 over the conductor means 42*b*, 42*c*, 42*d* and 42*e* from the inductor means 36*b*, 36*c*, 36*d* and 36*e*. The comparator device 40 is conventional and is designed to provide an output only in the event that the inputs from the chain character distributor 41 and from the inductor means 36*b*, 36*c*, 36*d* and 36*a* are equal (i.e., when the character read from the drum 34 and the character in position to be printed are the same).

Since information is stored on the drum 34 serial by digit, when read from the drum it will also be presented to the comparator unit 40 serial by digit. Hence, the information being presented to the comparator 40 from the drum 34 represents the information to be recorded on the record strip 17 (Fig. 1) commencing in the extreme left-hand column and advancing in order to the extreme right-hand position.

In operation, let it be assumed that, as the storage location eleven on the drum 34 is being read, the zero on the type chain belt 10, which is the first character of the second font of type, is now in position to be printed by the eleventh hammer $27_{11}$. At this point, one complete scan of all storage locations on the drum 34 has been made and the chain belt 10 is about to advance the type character one into the first printing position. As this advance takes place, the chain character distributor 41 advances and will contain a one when the type member 13 for the character one is in the position to print in print location one at the extreme left-hand of the record strip 17 (Fig. 1).

The succession of events just described will be repeated ten times and at the end of the tenth complete scan of the eleven storage locations on the drum 34, the type chain belt 10 will be found to be advancing the character zero again into the print position one. Also, it will be noted that at the end of the tenth scan, every possible type character on the chain belt 10 will have been presented to each of the eleven hammer positions.

Figure 3:
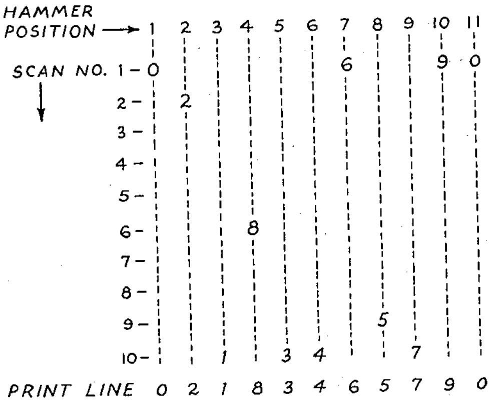
Fig. 3 is a graph that is helpful in understanding the operation of the printing machine of Figs. 1 and 2.

Each character stored in the drum at the time it is read is compared by the comparator 40 with the character then in position to be printed, regardless of its location. If the two are alike, the comparator 40 supplies an input to all of the amplifiers $38_1$–$38_{11}$. However, none of the magnets $30_1$–$30_{11}$ is now sufficiently energized to actuate a hammer. If, simultaneously, the print location distributor is also supplying an input to the one of the amplifiers $30_1$–$30_{11}$ for the printing location of the character then to be printed, the corresponding hammer will be actuated, printing that character at its proper location in a line on the record strip 17 (Fig. 1). The graph of Fig. 3 illustrates how a representative series of digits stored magnetically on the drum 34 might be printed on a line with the apparatus shown in Figs. 1 and 2.

In a full scale printing machine according to the invention, a much greater number of characters would be provided on the chain belt 10 of Fig. 1. For example, a typical font used in printing machines of this character comprises forty-eight characters including the ten decimal notations zero to nine, the twenty-six alphabetical notations A through Z, eleven special character notations, and a notation for a blank column, as listed in Fig. 5. The printer, therefore, might have two and one-half such fonts, making a total of one hundred and twenty type faces with one hundred and twenty hammers positioned to print in a like number of columns across the record strip 17 (Fig. 1). The spacing of the type on the chain belt 10 would be selected so that the one hundred and twenty hammer positions span one hundred and nineteen type.

Figure 4:
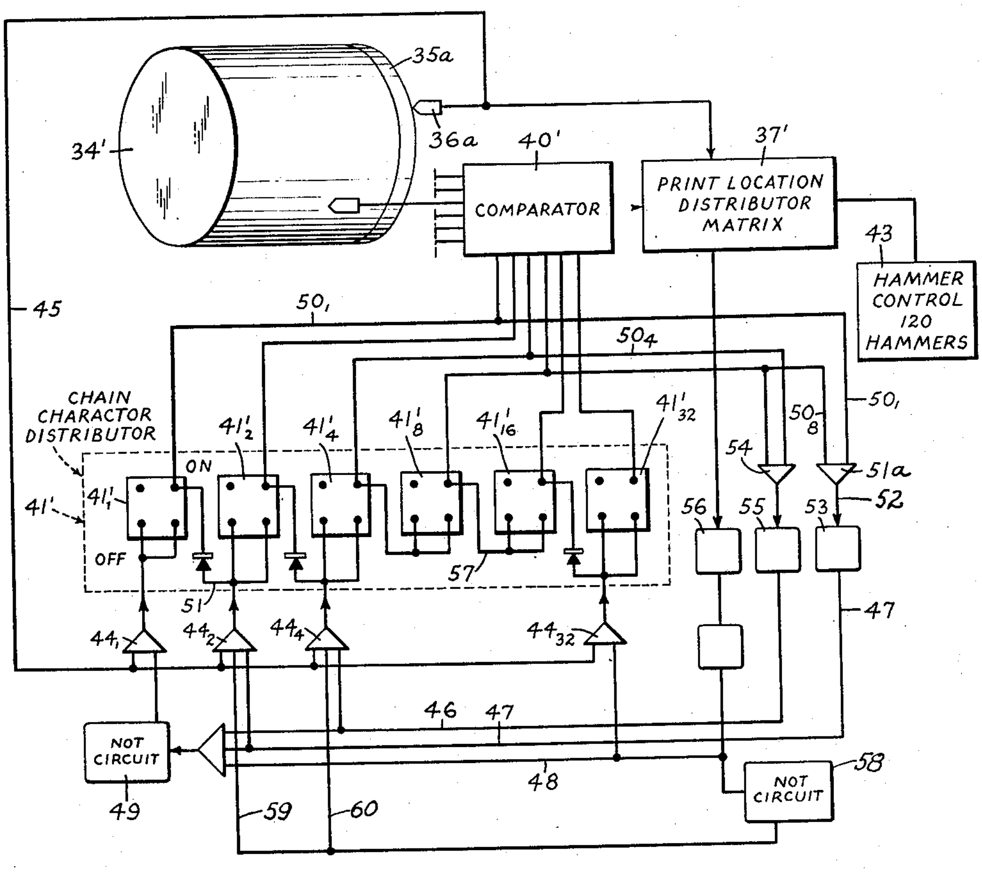
Fig. 4 is a schematic diagram of a typical control circuit that might be used for a printing machine of the type shown in Fig. 1 but designed to print any one of forty-eight characters in any one of one hundred twenty spaced columns across a page.

In such a machine, data might be stored on a magnetic drum 34′ (Fig. 4) in a six bit binary code in which the bit weights are one, two, four, eight, sixteen and thirty-two. Each of the six tracks on the drum 34′ might be one hundred and twenty-two storage locations in length, one hundred and twenty of them being related to the respective one hundred and twenty hammer positions. The two remaining storage locations provide time for circuit switching at the end of each scan of the hammers.

A typical control circuit for the full scale printer briefly described above is shown in Fig. 4. It is similar to the system illustrated in Fig. 2 in that it comprises a comparator 40′, a print location distributor matrix 37′, a hammer control device 43, and a chain character distributor 41′.

The chain character distributor 41′ is a modified binary counter designed to operate in the six bit code shown in Fig. 5. As previously mentioned, the type font of this printer consists of forty-eight characters and this figure illustrates the location and code assigned to each character of the font. It should be noted that although the sum of the bits of the characters is always in ascending order, there are eight places in the sequence where the increment to be added to the chain character distributor is a number other than one. By way of illustration, it will be noted that the type in the ninth position of the chain is the character nine and the sum of its bit representation is equal to nine, whereas the type in the tenth position of the chain is the pound or number sign, and the sum of its bit representation is eleven. Therefore, when the chain character distributor 41' contains a nine and it receives an impulse to advance, it must advance to eleven or a count of two rather than to ten.

Position No. 11 of the chain is assigned to the conventional account symbol, the sum of whose bits equals twelve while the twelve position of the chain contains the zero symbol and the sum of its bits equals sixteen. Therefore, each time the chain character distributor 41' contains a twelve and receives an impulse to advance, it must advance from twelve to sixteen or a count of four, rather than to thirteen. In fact, it will be noted that when the chain character distributor 41' stands at nine, twenty-five, forty-one, or fifty-seven, and it receives an impulse to advance, it must count two. Further, when it stands at twelve, twenty-eight, forty-four, and sixty, and receives a pulse to advance, it must advance by four. It should also be noted that in order to advance the chain character distributor 41' an amount equivalent to twenty-four type positions on the chain, it is merely necessary to reverse the state of the thirty-two trigger.

Consider the array of type presented to the 120 hammer positions during the scan of the 122 storage locations of the drum 34'. As previously stated, the 120 hammers will span 119 type positions and during the time required to scan the 122 storage locations, the type in the first hammer position will be advanced to its left and the type which was in the adjacent position to the right will be advanced into the first hammer position. Therefore, during the time to scan the 122 storage locations, 120 type faces will have been presented to 120 hammers. The 120 type faces will consist of two complete groups or fonts of the forty-eight pieces of type plus an additional half font or twenty-four pieces of type.

If at the beginning of this scan, the type in the first printing position was the character one and the chain character distributor 41' advanced in count equivalent to 120 type positions on the chain, at the end of the scan the distributor will contain a count of thirty-two. Before starting the next scan the count in the chain character distributor 41' must be restored to two since the character about to be presented to the No. 1 hammer is the character 2. In order to achieve this restoration, it is merely necessary to reverse the state of the thirty-two trigger during the scanning of the 121st drum location, to add one during the scanning of the 122nd drum location and to again add one during the scanning of the first drum location in a normal manner. Examination of Fig. 5 will show that, if these simple rules are followed, the chain character distributor 41' will advance the amount equivalent to one type position in starting each time a new scan is begun, and at the completion of the forty-eighth scan will again be ready to restart printing.

Returning now to Fig. 4, the chain character distributor 41' is shown in block diagram form as six conventional trigger circuits $41_1'$, $41_2'$, $41_4'$, $41_8'$, $41_{16}'$, and $41_{32}'$. In this representation, the left-hand side of each trigger represents the "off" condition and the right-hand side of the trigger represents the "on" condition. It will be noted that the output to input coupling of the various triggers is in the true binary fashion, but the input which would normally be connected to the trigger circuit $41_1'$ alone is also connected to the trigger circuits $41_2'$, $41_4'$ and $41_{32}'$ through the switches $44_1$, $44_2$, $44_4$ and $44_{32}$, respectively.

Assuming that the chain character distributor 41' is standing at zero and the drum is about to enter the position for reading the first storage location, the timing track 35*a* will induce a positive impulse in the inductor 36*a* which is transmitted by conductor means 45 to the four switches $44_1$, $44_2$, $44_4$ and $44_{32}$ and will attempt to let these four switches rise to a positive level. Since the chain character distributor 41' is standing at zero, the output of the "on" sides of all of the triggers will be negative, in which case the conductor means 46 and 47 will be negative, and, since we are not at the end of the scan, the conductor means 48 will also be negative, for reasons to be given below. As a result, the switches $44_2$, $44_4$ and $44_{32}$ are prevented from rising positive. At the same time, the mixed output of the conductor means 46, 47 and 48 which is presented to a conventional "NOT" circuit 49 does not actuate the trigger $44_1$ at this time, so that its output will be positive. Hence, the positive input pulse from the inductor 36*a* causes only the switch $44_1$ associated with the No. 1 trigger circuit $41_1'$ to rise to a positive state.

At the termination of an input pulse, the output of the switch $44_1$ again returns to a negative level abruptly which will trigger the trigger circuit $41_1'$ offside to the "off" condition, and onside to the "on" condition, causing an output of one which will be applied to the comparator circuit 40' over the conductor means $50_1$. When the second impulse from the inductor means 36*a* turns the trigger circuit $41_1'$ off, the trigger circuit $41_2'$ will be turned on through the binary coupling 51 and the chain character distributor 41' will contain a two. The third input pulse from the inductor means 36*a* will turn on the trigger circuit $41_1'$ causing both it and the trigger circuit $41_2'$ to be "on," at which time the chain character distributor 41' will contain a three. Counting will progress in increments of one until the chain character distributor 41' contains both a one and an eight at which time the onside outputs of the trigger circuits $41_1'$ and $41_8'$ are supplied to switching means 51*a* over the conductor means $50_1$ and $50_8$. The switching means 51*a* now provides an output over conductor means 52, delay means 53 and conductor means 47 to the switch $44_2$, one of the inputs of which is thereby driven positive.

At the same time, the output fed over the conductor means 47 will cause the "NOT" circuit 49 to hold the switch $44_1$ at the input of the trigger circuit $41_1'$ in the negative state. Now upon the arrival of the next input signal from the inductor means 36*a*, the trigger circuit $41_1'$ is prevented from turning off and the trigger circuit $41_2'$ is driven on which leaves the chain character distributor 41' standing with a one, a two, and an eight, the representation of eleven. With the chain character distributor 41' now standing at eleven, the impulse from the switch 51*a* through the delay means 53 turns negative by reason of the fact that the delay means 53 is a one-shot multivibrator providing a delay of the length necessary to overlap the next input pulse from the inductor means 36*a* but not of a length to allow overlapping of the second input pulse following triggering. Consequently, the next input pulse from the inductor means 36*a* causes the chain character distributor 41' to advance to twelve at which time it will contain an eight and four. The onside outputs of the eight and four trigger circuits $41_8'$ and $41_4'$ are fed through the conductor means $50_8$ and $50_4$ to another switch 54 which actuates another single shot multivibrator delay means 55. The delay means 55 now supplies an output over the conductor means 46 to the trigger circuit $41_2'$ and to the "NOT" circuit 49 associated with the input switch $44_1$ of the trigger circuit 41'.

The next input pulse arriving at the chain character distributor 41' finds the input switch $44_1$ to the trigger circuit $41_1'$ disabled, the input switch $44_2$ to trigger circuit $41_2'$ disabled, but the input switch $44_4$ to the trigger circuit $41_4'$ enabled due to the positive state of the conductor means 46. This pulse causes the trigger circuit $41_4'$ to reset which in turn resets the trigger circuit $41_8'$ which in turn sets the trigger circuit $41_1$ its on position through the binary coupling 57. Since the trigger circuits $41_1'$ and $41_2'$ were off at the arrival of this pulse, the chain character distributor 41' is now left with a count of sixteen standing in it.

Counting will now progress in increments of one until the chain character distributor 41' contains twenty-five, whence it will advance to twenty-seven, then to twenty-eight, and then to thirty-two, etc., until it contains sixty. This condition will be evidenced by the trigger circuits $41_4'$, $41_8'$, $41_{16}'$ and $41_{32}'$ all being in the "on" state, and the trigger circuits $41_1'$ and $41_2'$ being in the "off" state. Here again, due to the presence of an eight and a four output at the switch 54, the trigger circuits $41_1'$ and $41_2'$ are prevented from being turned on, the trigger circuit $41_4'$ is turned off, turning off the trigger circuit $41_8'$ which in turn causes the trigger circuit $41_{16}'$ to go off. With the turning off of the trigger circuit $41_{16}'$, the trigger circuit $41_{32}'$ goes off, and the chain character distributor 41' is returned to zero to begin the count for the next type font.

Counting continues until the 120th position of the print location distributor 37' is turned on. An output is now available to a one shot multivibrator delay means 56 connected to the conductor means 43 whose function it is to enable the input switch $44_{32}$ to the trigger circuit $41_{32}'$ and at the same time to disable the input switch $44_1$ to the trigger circuit $41_1'$ through the "NOT" circuit 49. The output of the delay means 56 is also supplied to a conventional "NOT" circuit 58 which supplies signals to the switches $42_2$ and $42_4$ over the conductors 59 and 69 to disable the trigger circuits $41_2'$ and $41_4'$ as well. Then, as the 121st output of the inductor means 36a is applied to the trigger circuit $41_{32}$ its then state is reversed. Between the 121st and 122nd pulse from the inductor means 36a', the output of the 120th position delay means 56 returns to zero, disabling the input switch $44_{32}$ to the trigger circuit $41_{32}'$ from the conductor means 43 and restoring or enabling the inputs to the trigger circuits $41_1'$, $41_2'$ and $41_4'$.

The 122nd output pulse from the inductor means 36a now advances the trigger circuit $41_1'$ to the "on" position, which would indicate that at the end of the scan the No. 1 type will be in the first hammer position. But now as the next impulse from the inductor means 36a is that associated with the No. 1 storage location, it advances the chain character distributor 41' so that it contains a two which is the character which is now advancing into hammer printing position one. Counting and scanning will continue until forty-eight complete scans of the 122 storage positions have been made. At this time, all forty-eight characters will have been presented to every hammer position across the page and the printing of the line is now complete. While it is necessary to complete forty-eight scans to insure printing of the entire line, had the information to be printed been arranged in the proper order, all of the printing could have been accomplished in the first scan, in which event the following forty-seven scans would represent idle time.

The invention thus provides novel means for controlling the printing operations in a chain printer. By virtue of the fact that the print location distributor scans the hammer positions sequentially from left to right across the page, the hammers are actuated in serial fashion. As a result, the circuitry is greatly simplified over that required for parallel printing, since the only memory required by the system is that provided by the magnetic drum.

The specific embodiments described above are intended to be merely illustrative and modifications in form and detail are possible within the skill of the art. Accordingly, the invention is intended to encompass all modifications falling within the scope of the appended claims.

I claim:

1. In printer mechanism, the combination of a plurality of type characters mounted for movement in a continuous path, a plurality of hammer means actuatable selectively to strike selected ones of said type characters, first storage means adapted to have a plurality of reference signal representations stored thereby at locations corresponding with said respective hammer means, second storage means adapted to have a plurality of character representations stored thereby at locations corresponding with said respective hammer means, first means for scanning said stored reference signal representations in timed relation to the movement of said type characters to produce first electric signals corresponding thereto, means responsive to said first electric signals for preparing circuits to actuate said hammer means in predetermined order, second means for scanning said stored character representations to produce second electric signals corresponding thereto, and means jointly responsive to said first and second electric signals for further acting upon said circuits to actuate said hammer means selectively.

2. In printer mechanism, the combination of a plurality of type characters mounted for movement in a continuous path, a plurality of hammer means actuatable selectively to strike selected ones of said type characters, first storage means adapted to have a plurality of reference signal representations stored thereby at locations corresponding with said respective hammer means, second storage means adapted to have a plurality of character representations stored thereby at locations corresponding with said respective hammer means, first means for scanning said stored reference signal representations in timed relation to the movement of said type characters to produce first electric signals corresponding thereto, means responsive to said first electric signals for preparing circuits to actuate said hammer means in predetermined order, second means for scanning said stored character representations to produce second electric signals corresponding thereto, third means responsive to said first electric signals for providing third electric signals representing said type characters, respectively, and means jointly responsive to said second and third electric signals for further actuating said circuits to actuate said hammer means selectively.

3. In printer mechanism, the combination of a plurality of type characters mounted for movement in a continuous path, a plurality of hammer means actuatable selectively to strike selected ones of said type characters, a plurality of electric circuit means energizable selectively to actuate said respective hammer means, first magnetic storage means adapted to have a plurality of reference signal representations stored thereby at locations corresponding with said respective hammer means, second magnetic storage means adapted to have a plurality of coded character representations stored thereby at locations corresponding with said respective hammer means, first means for scanning said stored reference signal representations in timed relation to the movement of said type characters to produce first electric signals corresponding thereto, first counter means responsive to said first electric signals for preparing said respective electric circuits successively to actuate said hammer means, second means for scanning said stored character representations to produce second electric signals corresponding thereto, second counter means responsive to said first electric signals for providing third electric signals representative of said type characters, and comparator means jointly responsive to said second and third electric signals for providing an electrical output to said plurality of circuit means only for like second and third electric signals to actuate the hammer means corresponding to the storage location then being scanned to strike the type character denoted by the character representation stored by said second storage means for that storage location.

4. In printer mechanism, the combination of a plurality of type characters mounted for movement in a continuous path having a portion equal in length to a line of characters to be printed, a plurality of hammer means spanning said path portion and actuatable selectively to strike selected ones of said type characters, said type characters being fewer in number than said hammer means, a plurality of circuit means energizable to actuate said respective hammer means, magnetic storage drum means adapted to have separate reference signal representations and character representations stored thereby each at storage locations equal in number to said hammer means and corresponding thereto, respectively, means for driving said type characters and said drum in timed relation, first inductor means for scanning said magnetic drum means to produce first electric signals corresponding to said stored reference signal representations, first counter means responsive to said first electric signals for partially energizing said respective circuit means successively in correspondence with the hammer means then in position to strike one of said type characters, second counter means responsive to said first electric signals and adapted to count repetitively to the number of said type characters for producing second electric signals representative of the count contained therein, second inductor means for scanning said magnetic drum means to produce third electric signals corresponding to said stored character representations, and comparator circuit means jointly responsive only to like second and third signals for further energizing said circuit means to actuate said hammer means to print characters in a line in accordance with said stored character representations.

5. Printer mechanism as defined in claim 4 in which the character representations are stored by the magnetic storage drum parallel by bit, serial by digit, in a multiple bit binary code, and the electric signal output of said second counter means represents the count contained therein in the same multiple bit binary code.

6. In printer mechanism, the combination of a plurality of type characters mounted for movement in a continuous path, a plurality of hammer means actuatable selectively to strike selected ones of said type characters, first storage means adapted to have a plurality of reference signal representations stored thereby at locations corresponding with said respective hammer means, second storage means adapted to have a plurality of character representations stored thereby at locations corresponding with said respective hammer means, first means for scanning said stored reference signal representations in timed relation to the movement of said type characters to produce first electric signals corresponding thereto, means responsive to said first electric signals for preparing circuits to actuate said hammer means in predetermined order, second means for scanning said stored character representations to produce second electric signals corresponding thereto, binary counter means having a plurality of interconnected stages representing the successive binary digits one, two, four and eight, respectively, input circuit means for supplying said first electric signals to said one, two and four stages, means rendered operative upon entry of counts in the one and eight stages for producing a signal to enable the two stage to respond to the next succeeding one of said first electric signals and to disable the one stage temporarily to render it nonresponsive to said next electric signal, and means jointly responsive to said second electric signals and to the output of said binary counter means and cooperative with said circuit preparing means for actuating said hammer means selectively.

7. In printer mechanism, the combination of a plurality of type characters mounted for movement in a continuous path, a plurality of hammer means actuatable selectively to strike selected ones of said type characters, a plurality of electric circuit means energizable selectively to actuate said respective hammer means, first magnetic storage means adapted to have a plurality of reference signal representations stored thereby at locations corresponding with said respective hammer means, second magnetic storage means adapted to have a plurality of coded character representations stored thereby at locations corresponding with said respective hammer means, first means for scanning said stored reference signal representations in timed relation to the movement of said type characters to produce first electric signals corresponding thereto, first counter means responsive to said first electric signals for preparing said respective electric circuits successively to actuate said hammer means, second means for scanning said stored character representations to produce second electric signals corresponding thereto, binary counter means having a plurality of interconnected stages representing the successive binary digits one, two, four and eight, respectively, input circuit means for supplying said first electric signals to said one, two and four stages, means rendered operative upon entry of counts in the four and eight stages for producing a signal to enable the four stage to respond to the next succeeding one of said first signals and to disable the one stage temporarily to render it nonresponsive to said next first signal, and comparator means jointly responsive to said second signals and to the output of said binary counter means for further energizing the electric circuit means for actuating said hammer means selectively.

8. In printer mechanism, the combination of a plurality of type characters mounted for movement in a continuous path, a plurality of hammer means actuatable selectively to strike selected ones of said type characters, a plurality of electric circuit means energizable selectively to actuate said respective hammer means, first magnetic storage means adapted to have a plurality of reference signal representations stored thereby at locations corresponding with said respective hammer means, second magnetic storage means adapted to have a plurality of coded character representations stored thereby at locations corresponding with said respective hammer means, first means for scanning said stored reference signal representations in timed relation to the movement of said type characters to produce first electric signals corresponding thereto, first counter means responsive to said first electric signals for preparing said respective electric circuits successively to actuate said hammer means, second means for scanning said stored character representations to produce second electric signals corresponding thereto, binary counter means having a plurality of interconnected stages representing the successive binary digits one, two, four and eight, respectively, input circuit means for supplying input signals to said one, two and four stages, means rendered operative upon entry of counts in the one and eight stages for producing a signal to enable the two stage to respond to the next succeeding one of said first electric signals and to disable the one stage temporarily to render it nonresponsive to said next first electric signal, means rendered operative upon entry of counts in the four and eight stages for producing a signal to enable the four stage to respond to the next succeeding one of said first electric signals thereafter and to disable the one stage temporarily to render it nonresponsive to said last-named next first electric signal, and comparator means jointly responsive to said second signals and to the output of said binary counter means for further energizing the electric circuit means for actuating said hammer means selectively.

9. In printer mechanism, the combination of a plurality of type characters mounted for movement in a continuous path, a plurality of hammer means actuatable selectively to strike selected ones of said type characters, a plurality of electric circuit means energizable selectively to actuate said respective hammer means, first magnetic storage means adapted to have a plurality of reference signal representations stored thereby at locations corresponding with said respective hammer means, second magnetic storage means adapted to have a plurality of coded character representations stored thereby at locations corresponding with said respective hammer means, first means for scanning said stored reference signal representations in timed relation to the movement of said type characters to produce first electric signals corresponding thereto, first counter means responsive to said first electric signals for preparing said respective electric circuits successively to actuate said hammer means, second means for scanning said stored character representations to produce second electric signals corresponding thereto, binary counter means having a plurality of interconnected stages representing the successive binary digits one, two, four, eight, sixteen and thirty-two, respectively, input circuit means for supplying said first electric signals to said one, two, four and thirty-two stages, means rendered operative when said first counter means registers a count equal to the number of said hammer means for producing a pulse to enable said thirty-two stage to respond to the next succeeding one of said first electric signals and to disable said one, two and four stages temporarily to render them nonresponsive to said last-named next first electric signal, and comparator means jointly responsive to said second signals and to the output of said binary counter means for further energizing the electric circuit means for actuating said hammer means selectively.

10. In printer mechanism, the combination of a plurality of type characters mounted for movement in a continuous path, a plurality of hammer means actuatable selectively to strike selected ones of said type characters, a plurality of electric circuit means energizable selectively to actuate said respective hammer means, first magnetic storage means adapted to have a plurality of reference signal representations stored thereby at locations corresponding with said respective hammer means, second magnetic storage means adapted to have a plurality of coded character representations stored thereby at locations corresponding with said respective hammer means, first means for scanning said stored reference signal representations in timed relation to the movement of said type characters to produce first electric signals corresponding thereto, first counter means responsive to said first electric signals for preparing said respective electric circuits successively to actuate said hammer means, second means for scanning said stored character representations to produce second electric signals corresponding thereto, binary counter means having a plurality of interconnected stages representing the successive binary digits one, two, four, eight, sixteen and thirty-two, respectively, first circuit means for supplying said first electric signals to said one, two, four and thirty-two stages, means rendered operative upon entry of counts in the one and eight stages for producing a signal to enable the two stage to respond to the next succeeding one of said first electric signals and to disable the one stage temporarily to render it nonresponsive to said next first electric signal, means rendered operative upon entry of counts in the four and eight stages for producing a signal to enable the four stage to respond to the next succeeding one of said first electric signals thereafter and to disable the one stage temporarily to render it nonresponsive to said last-named next first electric signal, means rendered operative when said first counter means registers a count equal to the number of said hammer means for producing a pulse to enable said thirty-two stage to respond to the next succeeding one of said first electric signals thereafter and to disable said one, two and four stages temporarily to render them nonresponsive to said last-named next first electric signal, and comparator means jointly responsive to said second signals and to the output of said binary counter means for further energizing the electric circuit means for actuating said hammer means selectively.

References Cited in the file of this patent

UNITED STATES PATENTS

| | | |
|---|---|---|
| 2,307,109 | Bryce | Jan. 5, 1943 |
| 2,343,398 | Bryce | Mar. 7, 1944 |
| 2,580,729 | Carroll | Jan. 1, 1952 |
| 2,692,551 | Potter | Oct. 26, 1954 |
| 2,757,605 | Dumey | Aug. 7, 1956 |
| 2,776,618 | Hartley | Jan. 8, 1957 |
| 2,799,222 | Goldberg | July 16, 1957 |
| 2,811,102 | Devol | Oct. 29, 1957 |
| 2,831,424 | MacDonald | Apr. 22, 1958 |